United States Patent [19]
Graf et al.

[11] 4,423,088
[45] Dec. 27, 1983

[54] METHOD FOR DEPOSITING ASPHALT

[75] Inventors: Peter E. Graf, Orinda; Judson E. Goodrich, San Rafael, both of Calif.

[73] Assignee: Chevron Research Company, San Francisco, Calif.

[21] Appl. No.: 178,056

[22] Filed: Aug. 14, 1980

Related U.S. Application Data

[63] Continuation of Ser. No. 22,762, Mar. 22, 1979, abandoned, which is a continuation-in-part of Ser. No. 820,261, Aug. 1, 1977, abandoned, which is a continuation-in-part of Ser. No. 732,849, Oct. 18, 1976, abandoned.

[51] Int. Cl.$^3$ .......................... B05D 5/10; E01C 5/12
[52] U.S. Cl. .................................. 427/138; 106/277; 252/311.5; 404/75; 405/265; 427/301
[58] Field of Search ............... 427/136, 138, 215, 299, 427/301, 403; 404/72, 75, 76, 82; 405/264, 265; 106/281 R, 281 N, 282, 277, 283; 252/311.5

[56] References Cited

U.S. PATENT DOCUMENTS

| 2,285,579 | 6/1942 | Gröner | 252/311.5 |
| 3,220,953 | 11/1965 | Borgfeldt | 252/311.5 |
| 3,359,738 | 12/1967 | Dybalski | 61/36 |
| 3,432,320 | 3/1969 | Pitchford | 106/277 |
| 3,513,005 | 5/1970 | Bradshaw et al. | 106/277 |
| 3,549,579 | 12/1970 | Sinclair | 260/29.7 |
| 3,738,852 | 6/1973 | Doi et al. | 106/277 |
| 3,859,227 | 1/1975 | Dwyer | 252/311.5 |
| 4,194,023 | 3/1980 | Cushman et al. | 427/138 |

Primary Examiner—Sadie L. Childs
Attorney, Agent, or Firm—D. A. Newell; J. M. Whitney; Q. T. Dickinson

[57] ABSTRACT

A method for depositing asphalt from an asphalt emulsion onto an aggregate is disclosed comprising wetting the aggregate with water containing between about 0.01 weight percent and about 1.0 weight percent of coupling agent selected to have charge opposite to the charge of said asphalt emulsion and applying said asphalt emulsion to the wetted aggregate.

5 Claims, No Drawings

METHOD FOR DEPOSITING ASPHALT

RELATED APPLICATION

This is a continuation of application Ser. No. 22,762, filed Mar. 22, 1979, now abandoned, which application is a continuation-in-part of U.S. Ser. No. 820,261, filed Aug. 1, 1977, which in turn is a continuation-in-part of U.S. Ser. No. 732,849, filed Oct. 18, 1976, all now abandoned.

BACKGROUND OF THE INVENTION

1. Field of the Invention

This application relates to open-graded, emulsified asphalt pavements, compositions suitable for their preparation, and methods for their preparation.

Open-graded pavements are generally defined in the paving art as aggregate blends or asphalt mixtures which have high voids content. The pavements may be prepared with either hot-mix asphalt or with asphaltic emulsions. They possess the characteristics of relatively low cost, and the ability to allow water drainage through the pavement structure. This last feature makes the pavements particularly desirable for overlays on existing high-speed highways to prevent "hydroplaning" vehicle skids caused by a film of water created between a smooth pavement surface and the tire surface.

The open-graded, emulsified asphalt pavements are of particular interest in remote areas far from plants where hot-mix asphalts are available. With the use of the emulsified asphalts, blending of the emulsions with the aggregates may be performed in blending plants set up easiliy in the remote areas.

With the use of emulsified asphalts in constructing open-graded pavements, several problems have, however, arisen. Because of the porous nature of the mix, the use of conventional slow setting emulsions (SS type) is not feasible. In such case, substantial amounts of the emulsion will drain from the structure (runoff) before setting occurs, resulting in loss of asphalt. The onset of rain before complete set occurs will result in the loss of even more asphalt from the pavement (washoff). Both runoff and washoff result in loss of strength in the pavement and possible environmental contamination. Therefore, to reduce these problems, the emulsions used in these applications have been weakly stabilized medium setting (MS type) so designed that they "break" when mixed with the aggregate. However, because of this early break, incomplete coating of the aggregate and poor adhesion of the asphalt and aggregate often occurs. In most cases, these results have been ameliorated by the addition of substantial quantities (5–15%, usually 8–10%, by weight relative to the weight of emulsion) of petroleum naphtha to the mixes. This results in softening of the asphalt providing better coverage and adhesion.

With the use of naphtha, new problems have arisen. First, the cost is high for the naphtha which is simply lost to the atmosphere by evaporation. Second, evaporation of the naphtha raises possible air pollution problems. Third, the hazard of fire during the operation is enhanced. Fourth, because naphtha softens the asphalt, the pavement requires considerable time to achieve full strength, and the use of heavy vehicles on the pavement before full strength is achieved may result in rutting of the surface. Therefore, it is desirable to produce open-graded emulsified asphalt paving mixes which display good aggregate coating properties and achieve desirable runoff and washoff characteristics without the use of naphtha, and form pavements which develop their full strength rapidly.

2. Description of the Prior Art

Anionic polyelectrolytes such as the salts of synthetic polycarboxylic acids have been disclosed as primary emulsifiers and emulsion stabilizers, although not specifically for bituments. Rohm and Haas Co. has described the use of neutralized acrylic polyacids marketed as "ACRYSOLS" as emulsifiers and as emulsion stabilizers with emulsions produced with nonionic emulsifiers.

Cationic polyelectrolytes, such as the quaternary salts of polyvinyl pyridine have also been disclosed for use as emulsion stabilizers and emulsifiers (reference: "Cationic Quaternary Polyelectrolytes—A Literature Review", M. Fred Hcover, a paper presented at the 159 National ACS Meeting, Sept. 9, 1969).

SUMMARY OF THE INVENTION

A paving composition and the process for producing it. The paving composition comprises about 80 to 97% by weight of an open-graded aggregate and about 3 to 20% by weight of a cationic or anionic bituminous emulsion, said emulsion comprising about 40 to 75% by weight of asphalt, relative to the emulsion, about 0.25 to 5.0% by weight relative to the emulsion of an emulsifier selected from the group consisting of cationic and anionic emulsifiers, and water as a continuous phase of said emulsion to make up 100% by weight, said composition also containing about 0.01 to 3.0% by weight relative to the emulsion of an ionic polyelectrolyte having an ionic charge opposite to the selected emulsifier.

DETAILED DESCRIPTION OF PREFERRED EMBODIMENTS OF THE INVENTION

We have now found that superior open-graded emulsified asphalt pavement can be prepared from a novel mixture of open-graded aggregate, a cationic or anionic (i.e., an ionic) emulsified asphalt, and a minor amount of an ionic polyelectrolyte which has the opposite charge to that of the asphalt emulsifier. These mixes give excellent aggregate coating, provide pavements which rapidly reach maximum strength, possess excellent water resistance properties (resistance to washoff and low runoff) without the presence of petroleum naphtha. Both cationic emulsified asphalt with a minor amount of an anionic polyelectrolyte and an anionic emulsified asphalt with a minor amount of a cationic polyelectrolyte are contemplated.

In a preferred embodiment, an anionic polyelectrolyte will be produced in situ, i.e., by basification of the emulsion which will contain a minor portion of a polyelectrolyte precursor (PEP), a polymeric polyacid.

The application of these open-graded, emulsified asphalt mixes may be carried out in several ways, which are as follows:

(1) A polyelectrolyte may be added to the emulsion and the mixture may be stored for a relatively short time, i.e., up to 4 hours. In some specific cases, the mixture may be stored for as long as 100 hours. The emulsion is then mixed with the aggregate shortly before application to the road bed or road surface. This method, as well as all of the others, allows sufficient working time of the mix to allow working (screeding, etc.) of the mix before it hardens.

(2) The aggregate may be pretreated with the polyelectrolyte, and mixing of the emulsion with the aggregate takes place shortly before application of the mix.

(3) The aggregate, emulsion and polyelectrolyte may be mixed at one time shortly before application.

Three additional methods may also be carried out with cationic emulsions only.

(4) A PEP may be used to pretreat the aggregate, and then the emulsion, in a form sufficiently basic to convert the PEP to the polyelectrolyte form, may be mixed with the aggregate.

(5) The aggregate, the PEP and the emulsion may be mixed together at one time, and the mix basified by mixing in adequate base to neutralize the precursor before use.

(6) A preferred method is to add the PEP to the emulsion, and mix the emulsion with the aggregate and base prior to use. The PEP-containing emulsion in this case may be stored for long periods.

One type of suitable asphalt emulsion is prepared with cationic emulsifiers. Among those are the emulsions described in U.S. Pat. Nos. 3,026,266, 3,096,292, 3,220,953, and 3,445,258. Any suitable cationic emulsifier capable of emulsifying bitumen in water may be used including cation active salts of quaternary nitrogen bases, salts of fatty amines, preferably straight-chain primary fatty mono and diamines, amidoamine salts, such as anidoamine hydrochloride of stearic acid, etc., the hydrohalide salts of aminoamides of polyalkylene polyamines such as tetraethylene pentamines and fatty acids, etc. Another class of suitable emulsifiers is that including the salts of ethylene oxide adducts of fatty diamines and of the ethylene oxide adducts of hydrocarbon-substituted imidazolines. This list is, of course, only illustrative, and not inclusive. The use of mixtures of the various cationic emulsifiers is also contemplated. The preferred cationic emulsifiers are those described as the salts of quaternary nitrogen bases disclosed in U.S. Pat. No. 3,220,953. These compounds are those materials of the preferred formula

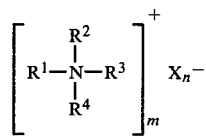

in which $R^1$, $R^2$, $R^3$ and $R^4$ are organic radicals, each having a carbon-nitrogen linkage to the nitrogen atom, X is an anion whose valence does not exceed 2, and m and n are small integers which indicate the molar proportions of the cation and anion required to form the respective salt. Preferred emulsifying salts are those in which the organic radicals $R^1$, $R^2$, $R^3$ and $R^4$ are alkyl, alkenyl, hydroxyalkyl, arylalkyl or alkylaryl radicals of 1 to 24 carbon atoms or heterocyclic groups of 4 to 10 carbon atoms in which from 2 to 3 of the nitrogen valences are shared by two carbon atoms in a single heterocyclic group. In all of these salts of quaternary nitrogen bases suitable for use as cationic emulsifiers in the preparation of oil-in-water type emulsions, the aggregate number of carbon atoms in the cationic portion of their molecule should be large enough to impart oil solubility and emulsifying properties, and preferably should be equal to and not less than 15 and not more than 30 carbon atoms. In other words, this class of cationic quaternary nitrogen-containing compounds is formed by salts of tetra-substituted ammonium bases and by salts of heterocyclic nitrogen bases, such as pyridinium, quinolinium, isoquinilinium, morpholininium, piperidinium, imidazolinium, and other like quaternary nitrogen-containing bases. The anion may be either a halide $(X^-)$, a methosulfate $(SO_4CH_3^-)$, a nitrate $(NO_3^-)$ or the like ion. Monovalent anions are preferred, particularly the halide anions.

Numerous cationic quaternary nitrogen-containing emulsifiers may be employed for the preparation of cationic oil-in-water-type emulsions. Among them, to mention but a few, are:

N,N-dimethyl-N-benzyl-N-octadecyl ammonium chloride
N,N-dimethyl-N-hydroxyethyl-N-dodecyl ammonium chloride
N,N-dimethyl-N-benzyl-N-octadecenyl ammonium chloride
N,N-dimethyl-N-benzyl-N-dodecyl ammonium chloride
N,N-dimethyl-N-hydroxyethyl-N-benzyl ammonium chloride
Hexadecyl pyridinium chloride
Hexadecyl triethyl ammonium bromide
Octadecylbenzyl trimethyl ammonium methosulfate
Isopropylnaphthyl trimethyl ammonium chloride
Octadecyl pyridinium bromide
1-(2-hydroxyethyl)-2-heptadecenyl-1-(4-chlorobutyl) imidazolinium chloride
Hexadecyl methyl piperidinium methosulfate
Dodecyl hydroxyethyl morpholinium bromide Among the quaternary nitrogen-containing materials available in commerce as cationic emulsifiers for the preparation of oil-in-water type emulsions, there are quaternary ammonium salts, such as quaternary ammonium halide materials sold by General Mills under the trademark "ALIQUAT"; materials sold by Armak Company under the several "ARQUAD" trademarks; certain quaternized materials developed and sold by the Society of Chemical Industry, in Basel, Switzerland, under the several "SAPAMINE" trademarks, and many others.

The active cationic component of these materials contains the characteristic positively charged quaternary nitrogen configuration

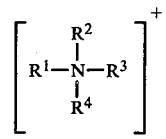

in which the aggregate of carbon atoms of $R^1$, $R^2$, $R^3$ and $R^4$ is sufficient to impart oil solubility and emulsifying properties, and preferably is equal to not less than 15 and not more than 30 carbon atoms.

Best emulsification can be achieved with those among the aforesaid quaternary nitrogen-containing materials in which the active cationic component contains at least one long aliphatic hydrocarbon chain of not less than 12 and not more than 24 carbon atoms, such as an alkyl or an alkenyl chain. This latter chain may be derived from a mixture of organic materials such as tallow, soybean oil, lard, etc.

The emulsifier material may consist entirely of an active cationic salt of a quaternary nitrogen base, or may also contain some impurities, such as acyl chlorides and amines. It may also be employed in the form of a concentrated aqueous solution and may contain auxiliary stabilizers in amounts conventionally employed in the trade.

Among the available commercial emulsifier materials of this type, the following may be employed for the preparation of cationic emulsions in accordance with the invention:

(1) HYAMINE 2389. This is the trademark of a product of Rohm and Haas Chemical Company, of Philadelphia, Pa., for N-alkyl methyl benzyl-N,N,N-trimethyl ammonium chloride, which has the following formula

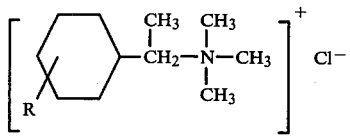

wherein R averages about 12 carbon atoms.

(2) ARQUAD T. This is the trademark of a product of Armak Company of Chicago, Ill., for $C_{14}$–$C_{18}$ alkyl trimethyl ammonium chloride, which has the following formula:

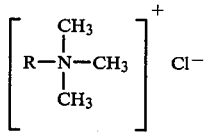

wherein R is a long alkyl chain derived from tallow.

(3) HYAMINE 1622. This is the trademark of a product of Rohm and Haas Chemical Company of Philadelphia, Pa., for di-isobutyl phenoxyethoxy ethyl dimethyl benzyl ammonium chloride monohydrate of the formula

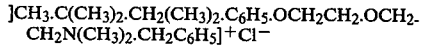

(4) ARQUAD S. This is the trademark of a product of Armak Company of Chicago, Ill., for $C_{16}$–$C_{18}$ alkyl trimethyl ammonium chloride, which has the formula:

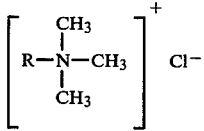

wherein R is a long alkyl chain derived from soybean oil.

It is believed that minor amounts of the starting materials ordinarily are present in the aforementioned emulsifiers as impurities of no consequence to their operativeness according to the invention.

These and other suitable cationic emulsifiers may be employed in varying amounts, generally from about 0.25 to about 5%, and preferably from about 0.40 to about 2% of the active cationic component, based on the weight of the finished emulsion, although more or less may be employed depending upon factors such as the cost of the emulsifier, its effectiveness as an emulsifying agent, the amount of bitumen dispersed, etc. The asphalt will be present in the emulsion in the amount of from about 40 to 75, preferably 60 to 70, weight percent relative to the emulsion. The balance of the emulsion will be water to make 100%.

Another type of suitable asphalt emulsion is prepared with anionic emulsifiers. Among those are the emulsions described in Canadian Pat. No. 812,658, British Pat. Nos. 864,102; 1,149,257; and 1,165,517, and U.S. Pat. Nos. 2,730,506; 2,436,046; 2,855,319; and 2,512,580. Any suitable anionic emulsifier capable of emulsifying bitumen in water may be used, including the alkali metal salts of sulfonic acids and carboxylic acids.

Carboxylic acid emulsifiers include the salts of fatty acids, naphthenic acids and cresylic acids. These salts are usually made from the alkali metals, and sodium is the preferred metal. The carboxylic acid salts are preferred.

Other carboxylic acid emulsifiers include the salts of tall oil acids, rosin acids, fatty acid pitch (residue from fatty acid distillation) and pine chip resin extract. This latter is the preferred carboxylic acid emulsifier.

The sulfonic acids used for forming anionic emulsions include the alkylaryl sulfonates having molecular weights in the range of 400 to 500, e.g., Bis(dodecylphenyl) ether disulfonic acid, octadecylbenzene sulfonic acid, polypropylenebenzene sulfonic acid, dioctylbenzene sulfonic acid, etc. All of the above acids are utilized as their alkali metal salts, preferably the sodium salt.

Naphthenic acids extracted from petroleum sources are good emulsifying agents for this purpose. The acid number of such naphthenic acids should be in the range of 75 to 175.

Polyelectrolytes are well-known substances (Encyclopedia of Polymer Science and Technology, Vol. 10, pages 781–854). Electrochemically a polyelectrolyte can be classified as polyacid, polybase or polyampholyte. This application is principally concerned with the polyacid and polybase polyelectrolytes. The polyelectrolyte additives may be described as water soluble high-molecular-weight polymers or copolymers with ionized substituent groups along the backbone chain. These ionized groups may be anionic or cationic in nature. Suitable polyelectrolyte precursors (PEP) are high-molecular-weight polymers or copolymers with anionic ionizable groups along the chain. These ionizable groups, namely acid groups, are readily converted to ionized groups by the addition of an appropriate base. These materials (polyelectrolytes and PEP's) may be either natural or synthetic. Preferably, the polymers used in this application are essentially linear (i.e. non-crosslinked); however, a small amount of crosslinking is acceptable provided that the polymer remains water soluble. The polyelectrolytes and the PEP's will usually be synthetic polymers having average molecular weights (as measured by gel permeation chromatography) of at least about 1,000, preferably 10,000 and as high as 10,000,000.

The anionic substituent ionized groups will be the salts of acidic groups attached to the polymer backbone, including for example, carboxylic acid groups, sulfonic acid groups, phosphonic acid groups, etc. Such acid groups are attached directly to the carbon atoms of the backbone or attached through a connecting atom or atoms such as an oxygen or sulfur atom, an imino group, a polymethylene group or combinations thereof. Examples of this type attachment include monosulfate acid groups, monophosphate acid groups, methylene carboxylic acid groups, and the like. The preferred ionizable and ionized substituents are the polycarboxylic acid and polycarboxylic acid salts. There will usually be from 2, preferably 3, to about 30 carbon atoms per monomer. That is, the polymer monomers will usually have from 3 to 30 carbon atoms and 1 or more acidic groups.

Synthetic polymers and copolymers having ionizable or ionized groups useful for this purpose are readily prepared by polymerizing or copolymerizing the appropriate monomers. Preferably, the monomers consist of monounsaturated compounds which undergo additional polymerization to form long, linear, polymers or copolymers. The addition of small amounts of di- or poly-unsaturated compounds will effect a small amount of cross-linking. Non-crosslinked polyelectrolytes are preferred.

It is to be understood that the salt of the ionizable group and the ionizable group itself may be formed after the polymer has been made as, for example, by hydrolyzing an anhydride such as polymaleic anhydride, or by saponifying a polyester, or polyamid, e.g., polymethacrylate, or polyacrylamide; or by hydrolyzing a nitrile group, e.g., polyacrylonitrile, etc.

Suitable acid or potential acid containing monomers for producing homo- or copolymers for this use include acrylic acid, acrylamide, acrylonitrile methyl acrylate, maleic anhydride, maleic acid, methacrylic acid, crotonic acid, allyloxyacetic acid, ethyl vinyl acetate, itaconic acid, citraconic anhydride, dimethyl fumarate, furfurylacrylic acid, 5-norbornene-2-acrylic acid, N-phenylmaleamic acid, vinyladipic acid, p-styrene sulfonic acid, p-styrene sulfinic acid, ethylene sulfonic acid, allyl hydrogen sulfate, allyl dihydrogen phosphate, allyl methyl hydrogen phosphate, p-vinyl phosphonic acid, and the like.

Suitable non-acid containing monomers useful for copolymerizing with one or more acid-containing monomers as, for example, from the above list to form suitable polyelectrolytes include methyl vinyl ether, methyl vinyl ketone, allyl ether, acrylonitrile, vinyl acetate, allyl methyl orthophthalate, vinyl octyl sulfide, ethylene, propylene, styrene, p-methoxy styrene, and others.

In addition, polymers with acid sulfate or acid phosphate ionizable groups may also be prepared by sulfating or phosphating polyvinyl alcohol with sulfuric or phosphoric acid.

Natural anionic polyelectrolytes useful for this process include hydrolyzed yeast or gum arabic, lignin sulfonates, polymerized rosin acids, etc. Protein polyelectrolytes including blood, casein, gelatin and the like are also suitable.

The preferred anionic polyelectrolytes are polyacrylic acid salts.

Suitable cationic substituent ionized groups are amino groups and the salts of quaternized amino groups attached to the polymer backbone. Upon solution in water, amines ionize by forming ammonium compounds with water. The substituents are attached directly to the polymer backbone or they may be attached through a connecting group such as a polymethylene group, a carbonyl containing group, an ether containing group, and aryl group, and the like. Quaternary amino substituents are made by adding sufficient organic halide or sulfate containing molecules to primary, secondary or tertiary amino groups to convert most of the nitrogens to the four-valent state, such that each nitrogen atom has four groups directly attached to it and also has a net positive charge. Preferably, the quaternizing agents is methyl chloride.

Amino containing polymers may be prepared by homo- or copolymerizing unsaturated amino compounds. Among such compounds are vinylamine, ethylene imine, 4-vinylpyridine, 3-allylpyridine, N-allylpiperidine, allyl diethylamine, N,N-diethylaminoethylacrylamide, N,N-dimethylaminoethylmethacrylic acid, vinylenedipyridine, 2-vinylquanidine, p-diethylaminoethoxyethylmethacrylate, etc.

Amine-containing polymers may also be prepared by aminomethylation, as for example by reacting polyacrylamide with formaldehyde and dimethylamine.

Suitable non-amine monomers useful for copolymerizing with one or more amine-containing compounds to produce amine-containing copolymers include methyl vinyl ether, methyl vinyl ketone, allyl ethyl ether, acrylonitrile, vinyl acetate, allyl methyl ortho phthlate, ethylene, propylene, styrene, p-methoxystyrene, etc.

The polyelectrolytes will be employed in the mixes in a concentration effective to prevent runoff, usually from about 0.01 to 3.0%, preferably 0.05 to 1.0%, by weight relative to the weight of the asphalt emulsion.

In a preferred embodiment, the additive will be an anionic polyelectrolyte precursor when the emulsion is formed with a cationic emulsifier. This precursor will be a polymer corresponding to the polyelectrolytes, but containing unneutralized acid groups. These materials usually are sold in the form of aqueous emulsions. An example of such a material is Primafloc A-10, sold by Rohm and Haas Co., Philadelphia, Pa. This material is described as an acid-containing polyacrylic acid emulsion polymer. It and other related products have been described as being useful as emulsion stabilizers in combination with non-ionic surfactants (primary emulsifiers).

The asphalt emulsions are prepared in the manner conventional for anionic or cationic bituminous emulsions. Thus, for example, in preparing the cationic emulsions, the cationic emulsifier is first dissolved in water, preferably at a temperature of 100°–125° F. Then the asphalt, heated at 240°–280° F. is dispersed in the resulting aqueous solution in a colloid mill. Usually, from 60 to 70 parts of asphalt are thus emulsified with 30 to 40 parts of the water solution containing the cationic emulsifier and optionally other additives. The emulsion may be used immediately thereafter or, alternatively, stored for use at a later time. The anionic emulsions are prepared in the same way using an anionic emulsifier.

In a preferred embodiment, the anionic polyelectrolyte precursor is added in an appropriate amount to the emulsifying water prior to preparation of the cationic emulsion. In this form, the emulsion may be stored for extended periods of time prior to use; it will remain stable for up to several months. Thus, at the application time, usually a sufficient quantity of base is added to the emulsion to provide a pH to the emulsion of greater than 7 and usually greater than about 11. In certain cases, sufficient basicity is contributed by the aggregate to effect neutralization of the polyelectrolyte without additional base being used. These cases usually occur with limestone-containing aggregates. Any base is suitable. Thus, suitable bases include a variety of organic and inorganic bases. The alkali metal bases are preferred. Sodium hydroxide is particularly preferred.

Suitable aggregates for use with the emulsions of this invention include a wide variety of siliceous and calcareous materials. As previously mentioned, the so-called "open graded" aggregates are preferred.

The open-graded asphalt mixes are described in "Design and Construction of Emulsified Asphalt Open Graded Mixes and Overlays" by L. D. Coyne presented at the Twenty-Third Annual Road Builders Clinic, University of Idaho, Moscow, Idaho, Mar. 17, 1972. Such a mix is generally defined as an aggregate blend or asphalt mixture which has a high voids content, usually lacking in fine aggregates (sand) and mineral fillers. Federal Highway Administration, Region 10, Emory Richardson, W. A. Liddle, "Experience in the Pacific Northwest with Open Graded Emulsified Asphalt Pavements" defines the open-graded asphalt-paving mixes characterized by the use of asphalt emulsion, aggregates as crushed stone or crushed gravel aggregate with less than 10 percent passing the No. 10 sieve and 20 to 30 percent air voids in the compacted pavement. A consistent aspect of almost all definitions of open-graded aggregate is that less than 2 percent passes a No. 200 screen. The aggregate should preferably be relatively clean, that is, the presence of substantial quantities of dust will require higher quantities of emulsifier in the mixes. The paving composition will contain about 3 to 20, preferably 5 to 10, percent by weight of emulsion and about 97 to 80, preferably about 95 to 90 percent by weight of open-graded aggregate based on the weight of said paving composition.

EXAMPLES

The following examples illustrate this invention. The examples are only illustrative and are nonlimiting.

A specially-developed test was employed for evaluating the coating ability and water resistance of emulsions used in making open-graded aggregate mixes. The test is a variation of ASTM Test Method D-244. The test specifically measures (1) coating, (2) stripping resistance, (3) runoff, (4) washoff, and (5) workability (stiffness) of the mixes. The test procedure is as follows:

(1) 100 g of open-graded aggregate is added to a mixing bowl.

(2) The aggregate is wetted with water which may contain base or polyelectrolyte.

(3) The required amount (7 g.) of emulsion is added to the aggregate.

(4) The mixture is stirred for 15 seconds with a Hobart Mixer (using a "B" blade).

(5) Note is taken whether the emulsion disperses completely over the aggregate, and whether stripping occurs (asphalt being pulled from coated rock).

(6) The mixture is transferred to a pan with an aperture on one side.

(7) The pan is tilted and the quantity of emulsion that drains from the aperture is collected. Drying the drained material gives the asphalt lost by runoff.

(8) A portion of the mix is removed, and the ease of working is estimated. This sample is washed with cold water until the wash water runs clear.

(9) The percent of asphalt coating is estimated for the washed and unwashed portions, the difference giving "washoff".

EXAMPLE 1

This example demonstrates the use of anionic polyeletrolytes in combination with a cationic asphalt emulsion. The emulsion was prepared from a 70/80 penetration paving grade asphalt at 65 weight percent relative to the total weight of the emulsion. The emulsifier used was Arquad T-50, a cationic quaternary previously described, employed at a concentration of 1% by weight relative to the emulsion.

The polyelectrolytes being tested were added as aqueous solutions to the aggregate before mixing with the emulsions. The total weight of water and polyelectrolyte was 2% by weight relative to the aggregate. The polyelectrolytes used were:

(a) NaOH-neutralized Primafloc-A-10 (previously described);

(b) Dow Chemical Purifloc-A-23, a neutralized hydrolyzed polyacrylamide;

(c) Swift Chemical Co. Flocculant X-400.

The following Table I shows the results of the tests. The aggregates employed were a variety of types; in each 90% passed a ⅜ screen and is retained on a No. 4 screen and 10% passes a No. 10 screen and is retained on a No. 20 screen, except the dusty limestone which was a gross-graded limestone containing about 2% dust passing a 200 screen.

TABLE I

Effect of Anionic Polyelectrolyte Pretreatment of Aggregate and a Cationic Asphalt Emulsion

| Test | Polyelectrolyte Type | % wt.** | Aggregate | Workability* Initial | @ 60 min. | % Coating @ 60 min. Before wash | After wash | Runoff, wt. % |
|---|---|---|---|---|---|---|---|---|
| 1 | None | 0 | Granite | RM | RM | 100 | 60 | 7.6 |
| 2 | None | 0 | Silica | RM | RM | 100 | 10 | 9.8 |
| 3 | (b) | 0.002 | Granite | RM | RM | 100 | 85 | 0 |
| 4 | (b) | 0.002 | Silica | RM | RM | 100 | 30 | 5.5 |
| 5 | (c) | 0.002 | Granite | RM | RM | 98 | 20 | 0 |
| 6 | (c) | 0.002 | Silica | RM | RM | 100 | 90 | 0 |
| 7 | (a) | 0.002 | Granite | RM | RM | 100 | 95 | 0 |
| 8 | (a) | 0.002 | Silica | RM | RM | 100 | 40 | 0 |
| 9 | (b) | 0.004 | Granite | RM | RM | 100 | 98 | 0 |
| 10 | (b) | 0.004 | Silica | RM | RM | 100 | 80 | 0 |
| 11 | (c) | 0.004 | Granite | RM | RM | 80 | 80 | 0 |
| 12 | (c) | 0.004 | Silica | RM | RM | 100 | 100 | 0 |
| 13 | (a) | 0.004 | Granite | RM | RM | 100 | 100 | 0 |
| 14 | (a) | 0.004 | Silica | RM | RM | 100 | 95 | 0 |
| 15 | None | 0 | Gravel | RM | MS | 100 | 50 | 14.3 |
| 16 | None | 0 | Dolomite | RM | RM | 100 | 10 | 27.1 |
| 17 | None | 0 | Limestone | RM | RM | 100 | 20 | 7.4 |
| 18 | None | 0 | "Dusty" limestone | RM | RM | 98 | 90 | |
| 19 | (a) | 0.004 | Gravel | RM | RM | 100 | 98 | 0 |
| 20 | (a) | 0.004 | Dolomite | RM | RM | 100 | 95 | 0 |
| 21 | (a) | 0.004 | Limestone | RM | RM | 100 | 100 | 0 |
| 22 | (a) | 0.004 | "Dusty" | RM | RM/MS | 95 | 95 | 0 |

TABLE I-continued

Effect of Anionic Polyelectrolyte Pretreatment of Aggregate and a Cationic Asphalt Emulsion

| Test | Polyelectrolyte Type | % wt.** | Aggregate | Workability* Initial | Workability* @ 60 min. | % Coating @ 60 min. Before wash | % Coating @ 60 min. After wash | Runoff, wt. % |
|---|---|---|---|---|---|---|---|---|
| 23 | (a) | 0.004 | limestone Granite | RM | RM | 100 | 100 | 0 |
| 24 | (a) | 0.004 | Silica | RM | RM | 100 | 98 | 0 |

*RM = readily mixable
MS = moderately stiff
**Relative to weight of aggregate

These data show that effective coating and workability are attained, the runoff of the emulsions is eliminated, and washoff reduced by use of the polyelectrolytes in pretreatment of the aggregates.

EXAMPLE 2

In this example, an anionic PEP was used in combination with a cationic asphalt emulsion.

In the following tests, the emulsion was prepared as in Example 1; to that was added Primafloc A-10 (unneutralized), described above, at 0.3% by weight. The aggregate was prewet with 2% by weight of NaOH solutions (at different pH) relative to the weight of aggregate. Seven weight percent of the emulsion was employed. The results of the tests are shown in Table II.

TABLE II

Effect of pH of Prewet

| Aggregate | Prewet 2% water | Workability[1] Initial | Workability[1] After 60 min. | % Coating @ 60 min. Initial | % Coating @ 60 min. After Washoff | Runoff, % |
|---|---|---|---|---|---|---|
| 1. Silica | pH 11.5[2] | RM | RM | 100 | 30 | 7.6 |
| 2. Silica | pH 12.0[2] | RM | MS | 100 | 98 | 0 |
| 3. Silica | pH 11.5[3] | RM | RM | 100 | 20 | 9.8 |
| 4. Silica | pH 12.0[3] | RM | RM | 100 | 100 | 0 |
| 5. Limestone | pH 11.5 | RM | MS | 98 | 85 | 0 |
| 6. Limestone | Dist. H$_2$O | RM | RM/MS | 98 | 85 | 0 |

[1]RM = readily mixable
MS = moderately stiff
[2]Stored at room temperature.
[3]Stored at 140° F.

These data show the activation of the polyelectrolyte precursor by basic solution, the activation being enhanced with the more basic solution. Tests 5 and 6 show that effective activation occurs with certain aggregates with lower pH solutions. Storage at elevated temperatures, such as 140° F., does not destroy the effectiveness of the method.

EXAMPLE 3

Tests were performed with open-graded silica aggregate, varying the concentration of the cationic emulsifier (Arquad T-50), the polyelectrolyte precursor (Primafloc A-10), and the pH of the prewetting liquid. The polyelectrolyte precursor was added to the water along with the cationic emulsifier prior to making the emulsion. The asphalt was the same type as that employed in Examples 1 to 2. The results are set forth in Table III, following.

TABLE III

Performance of Emulsion Prepared with Anionic Polyelectrolyte Precursor in Emulsifying Water of Cationic Asphalt Emulsion

| | % Cationic Emulsifier | % Polyelectrolyte | Prewet (pH) | Workability* Initial | Workability* After 60 min. | % Coating @ 60 min. Initial | % Coating @ 60 min. After Washoff | Runoff, % |
|---|---|---|---|---|---|---|---|---|
| 1. | 1 | — | Dist. H$_2$O (5.7) | Loose | Loose | 100 | 10 | 30.5 |
| 2. | 1 | 0.3 | " | " | " | 100 | 20 | 4.8 |
| 3. | 1 | 0.4 | " | " | " | 100 | 20 | 4.5 |
| 4. | 1 | 0.5 | " | " | " | 100 | 30 | 5.0 |
| 5. | 1.2 | — | " | " | " | 100 | 10 | 28.1 |
| 6. | 1.2 | 0.3 | " | " | " | 80 | 30 | 0 |
| 7. | 1.2 | 0.4 | " | " | " | 100 | 30 | 5.0 |
| 8. | 1.2 | 0.5 | " | " | " | 60 | 30 | 0 |
| 9. | 1.5 | — | " | " | " | 100 | 10 | 20.2 |
| 10. | 1.5 | 0.3 | " | " | " | 100 | 10 | 11.9 |
| 11. | 1.5 | 0.4 | " | " | " | 100 | 10 | 33.3 |
| 12. | 1.5 | 0.5 | " | " | " | 100 | 10 | 23.1 |
| 1. | 1 | — | NaOH sol. (11.5) | " | " | 100 | 10 | 33.8 |
| 2. | 1 | 0.3 | " | RM | RM | 100 | 95 | 0 |
| 3. | 1 | 0.4 | " | RM | RM | 100 | 98 | 0 |
| 4. | 1 | 0.5 | " | RM | RM | 100 | 98 | 0 |
| 5. | 1.2 | — | " | Loose | Loose | 100 | 10 | 29.5 |
| 6. | 1.2 | 0.3 | " | RM | Loose | 80 | 40 | 0 |
| 7. | 1.2 | 0.4 | " | RM | RM | 100 | 95 | 0 |
| 8. | 1.2 | 0.5 | " | RM | RM | 100 | 98 | 0 |
| 9. | 1.5 | — | " | Loose | Loose | 100 | 10 | 27.9 |

TABLE III-continued

Performance of Emulsion Prepared with Anionic Polyelectrolyte Precursor in Emulsifying Water of Cationic Asphalt Emulsion

| % Cationic Emulsifier | % Polyelectrolyte | Prewet (pH) | Workability* Initial | After 60 min. | % Coating @ 60 min. Initial | After Washoff | Runoff, % |
|---|---|---|---|---|---|---|---|
| 10. 1.5 | 0.3 | " | RM | RM | 100 | 40 | 0 |
| 11. 1.5 | 0.4 | " | RM | RM | 100 | 80 | 0 |
| 12. 1.5 | 0.5 | " | RM | RM | 100 | 90 | 0 |

*RM = readily mixable

These data show that the emulsions prepared with the PEP present in the emulsifying water, when contacted with aggregate prewet with pH 11.5 prewetting liquid, eliminate runoff and improve water resistance of the coatings. Note that setting occurs with pH 11.5 prewet liquid in this case, whereas with the emulsions of Example 2, in which the PEP was added to the emulsion after its preparation, pH 11.5 liquid failed to cause setting, and pH 12 liquid was required.

EXAMPLE 4

In this test a cationic polyelectrolyte was used in combination with an anionic asphalt emulsion. The emulsion was prepared as in Example 1, except that 0.3% Vinsol Resin (Hercules Inc.) in dilute sodium hydroxide solution was used as the emulsifier. The test procedure used was that described hereinabove before these examples.

Blends were prepared using the above anionic emulsion to which was added Purifloc C-31 (Dow Chemical Co.), a cationic polyelectrolyte. Purifloc C-31 is a high-molecular-weight, water-soluble synthetic cationic polyelectrolyte having the following approximate structure:

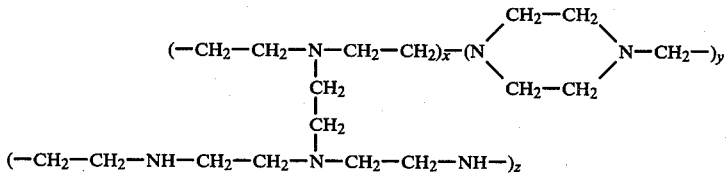

Results are set forth in Table IV, following.

TABLE IV

Effect of Addition of Cationic Polyelectrolyte to Anionic Asphalt Emulsion

| Purifloc C-31, wt % | Aggregate | Workability Initial | at 60 min. | % Coating at 60 min. Before wash | After wash | Runoff wt % |
|---|---|---|---|---|---|---|
| 0 | silica | Too loose | RM | 100[1] | 10 | 15.0 |
| 0.1 | silica | Too loose | RM | 100[1] | 20 | 3.0 |
| 0.25 | silica | loose RM | RM | 100 | 90 | 0 |

[1]Thin coating.

These data show that without the polyelectrolyte, the emulsion was readily washed off the stones and had high runoff. With the polyelectrolyte the water resistance of the mix was greatly improved, and runoff was eliminated.

EXAMPLE 5

Numberous other available anionic and cationic polyelectrolytes were tested with asphalt emulsions having the opposite charge. The method of testing was the same as previously described and the following Table V indicates the nature of the emulsion and the nature of the commercial polyelectrolyte as well as the results obtained. Although the detailed chemical composition of the polyelectrolytes are not identified by the manufacturers, the results below illustrate the beneficial results obtained when an ionic polyelectrolyte is added to an asphalt emulsion of the opposite charge.

Miscellaneous cationic polyelectrolytes were evaluated in combination with an anionic emulsion made with 0.3% Vinsol Resin emulsifier by the procedure of Example 1. The aggregate employed was an open-graded silica aggregate. The data are given in Table V.

TABLE V

Evaluation of Miscellaneous Cationic Polyelectrolytes

| Product Identification | Supplier | Basic Composition per Supplier | Polyelectrolyte Concentration, wt %* | Runoff % (wt.) |
|---|---|---|---|---|
| None | — | — | — | 21.8 |
| Gafaid Q | GAF | Quaternary Polyelectrolyte | 0.1 | 0 |
| Betz 1150 | Betz | Cationic Acrylamide Copolymer, MW 5,000,000 | 0.1 | 0 |
| Betz 1160 | Betz | Cationic Acrylamide Copolymer, MW 5,000,000 | 0.04 | 0 |
| Cato 8 | National Starch | Cationic Corn Starch Derivatives | 1.98 | 0 |

TABLE V-continued

| Evaluation of Miscellaneous Cationic Polyelectrolytes | | | | |
|---|---|---|---|---|
| Product Identification | Supplier | Basic Composition per Supplier | Polyelectrolyte Concentration, wt %* | Runoff % (wt.) |
| Natron 86 | National Starch | Cationic Polyelectrolyte | 0.4 | 0 |
| Primafloc C-7 | Rohm and Haas | Cationic | 0.06 | 0 |
| Primafloc C-7 | Rohm and Haas | Cationic | 0.006 | 11.0 |
| Primafloc C-7 | Rohm and Haas | Cationic | 0.02 | 8.6 |
| Primafloc C-7 | Rohm and Haas | Cationic | 0.04 | 0 |
| Lufax 295 | Rohm and Haas | Salt of Complex Polyamine | 0.05 | 0 |
| Catfloc | Calgon | Cationic Polyelectrolyte | 0.25 | 0 |
| Superfloc 16 | American Cyanamid | — | 0.20 | 0 |
| Aqua-Rid 49-101 | Reichhold | — | 0.30 | 0 |

*Relative to weight of emulsion

Miscellaneous anionic polyelectrolytes were evaluated in combination with a cationic asphalt emulsion made with 1.0% Arquad T-50 emulsifier, by determining the minimum concentration of polyelectrolyte necessary to prevent runoff from open-graded Watsonville granite aggregate when tested by the procedures previously described. The data are given in Table VI.

TABLE VI

| Evaluation of Miscellaneous Anionic Polyelectrolytes | | | |
|---|---|---|---|
| Product Identification | Supplier | Basic Composition per Supplier | Minimum Concentration To Prevent Runoff (ppm)* |
| Primafloc A-10 | Rohm and Haas | Polyacrylic acid | 5 |
| #0627 | Polyscience, Inc. | Polyacrylic acid, MW = 50,000 | 20 |
| #4550 | Polyscience, Inc. | Polyacrylic acid, MW = 100,000 | 20 |
| #4551 | Polyscience, Inc. | Polyacrylic acid, MW = 300,000 | 10 |
| #6500 | Polyscience, Inc. | Polyacrylic acid, MW = 1,000,000 | 200 |
| #6501 | Polyscience, Inc. | Polyacrylic acid, MW = 4,000,000 | 200 |
| #3312 | Polyscience, Inc. | Polyacrylic acid, MW = 250,000 | 100 |
| #4652 | Polyscience, Inc. | Poly (acrylamide-acrylic acid), MW = 200,000 | 20 |
| #0029 | Polyscience, Inc. | Agar | >400 |
| #2806 | Polyscience, Inc. | Polyacrylamide, MW = $5 - 6 \times 10^6$ | 40 |
| Resin 87D | Dow | Slightly anionic, low MW | 100 |
| Separan NP-10 | Dow | Slightly anionic, medium MW | 20 |
| Separan PG-6 | Dow | Anionic, low MW | 20 |
| Separan AP-30 | Dow | Anionic, medium MW | 20 |
| Separan AP-273 | Dow | Anionic, very high MW | 20 |
| Versa-TL 127 | National Starch | Sulfonated Polystryrene, MW = 120,000 | 400 |
| Daxad 15 | W. R. Grace | Poly(alkylnaphthalene) sulfonic acid | 40 |
| Daxad 21 | W. R. Grace | Poly aryl sulfonic acid | 40 |
| Magnifloc 834A | American Cyanamid | Carboxylic salt | 20 |
| Magnifloc 905N | American Cyanamid | Carboxylic salt | 40 |
| Magnifloc 870A | American Cyanamid | Carboxylic salt | 200 |
| Gantrez AN 119 | Gen. Aniline Film | Poly(methylvinylether/maleic anhydride) | 100 |
| Gantrez AN 169 | Gen. Aniline Film | Poly(methylvinylether/maleic anhydride) | 40 |
| PA-18 | Gulf | Copolymer of octadecene-1 and maleic anhydride, MW = low | >400 |
| T.P. Flocculant X400 | Swift | — | 20 |
| Nalcolyte 677 | Nalco Chem. | Medium anionic | 40 |
| Jaguar 806 | Stein Hall | Guar gum derivative | 200 |
| Jaguar CMHP | Stein Hall | Carboxymethylhydroxypropyl guar | 40 |
| Gum Arabic | Stein Hall | Salt of Arabic acid | 200 |

*Relative to Emulsion

As will be evident to those skilled in the art, various modifications on this invention can be made or followed, in the light of the foregoing disclosure and discussion, without departing from the spirit or scope of the disclosure or from the scope of the following claims.

What is claimed is:

1. A method for depositing asphalt from an asphalt emulsion onto an aggregate, that comprises wetting down the aggregate with water containing between about 0.01 weight percent and about 1.0 weight percent of coupling agent selected to have charge opposite to the charge of said asphalt emulsion and applying said asphalt emulsion to the wetted aggregate.

2. The method of claim 1, wherein said aggregate is sand, said coupling agent is cationic, and said asphalt emulsion is anionic.

3. The method of claim 1, wherein said aggregate is sand, said coupling agent is anionic, and said asphalt emulsion is cationic.

4. The method of claim 1, wherein said aggregate is limestone, said coupling agent is anionic, and said asphalt emulsion is cationic.

5. The method of claim 1, wherein said aggregate is gravel, said coupling agent is cationic, and said asphalt emulsion is anionic.

* * * * *